US012810308B2

United States Patent
Schroeder et al.

(10) Patent No.: US 12,810,308 B2
(45) Date of Patent: Nov. 24, 2026

(54) METHODS AND TOOLS FOR PREVENTING THE COUNTERFEITING AND TAMPERING OF SEMICONDUCTOR DEVICES

(71) Applicant: Intel Corporation, Santa Clara, CA (US)

(72) Inventors: Michael A. Schroeder, Chandler, AZ (US); Sean Bushell, Peoria, AZ (US); William F. Herrington, Scottsdale, AZ (US); Hannah Rowe, Chandler, AZ (US); Sarah Shahraini, Newcastle, WA (US); Ryan Pate, Gilbert, AZ (US); Erasenthiran Poonjolai, Chandler, AZ (US); Saikumar Jayaraman, Chandler, AZ (US); Fariaz Karim, Gilbert, AZ (US)

(73) Assignee: INTEL FOUNDRY IP LLC, Santa Clara, CA (US)

( * ) Notice: Subject to any disclaimer, the term of this patent is extended or adjusted under 35 U.S.C. 154(b) by 944 days.

(21) Appl. No.: 17/883,718

(22) Filed: Aug. 9, 2022

(65) Prior Publication Data

US 2024/0054502 A1 Feb. 15, 2024

(51) Int. Cl.
*G06Q 30/018* (2023.01)
*G06V 10/14* (2022.01)
(Continued)

(52) U.S. Cl.
CPC ........... *G06Q 30/018* (2013.01); *G06V 10/14* (2022.01); *G06V 20/80* (2022.01); *G06V 20/95* (2022.01); *H04L 9/3236* (2013.01)

(58) Field of Classification Search
None
See application file for complete search history.

(56) References Cited

U.S. PATENT DOCUMENTS 11,558,531 B2 * 1/2023 Sardesai ............ H04N 1/00875
12,321,950 B2 * 6/2025 Dyne .................. G06Q 30/018
(Continued)

OTHER PUBLICATIONS

U. Guin, K. Huang, D. DiMase, J. M. Carulli, M. Tehranipoor and Y. Makris, "Counterfeit Integrated Circuits: a Rising Threat in the Global Semiconductor Supply Chain," in Proceedings of the IEEE, vol. 102, No. 8, pp. 1207-1228, Aug. 2014 (Year: 2014).*
(Continued)

*Primary Examiner* — Jeffrey R Swearingen
(74) *Attorney, Agent, or Firm* — Viering, Jentschura & Partner mbB

(57) ABSTRACT

The present disclosure is directed to an authentication system, tools, and methods for authentication including a first inspection tool that generates first images for a first inspection of a device, and a first processor for processing the first images using a hashing algorithm, for which the first inspection tool and the first processor are sited at a first location, and a second inspection tool that generates second images for a second inspection of the device, and a second processor for processing the second images using the hashing algorithm, for which the second inspection tool and the second processor are sited at a second location. The second processor compares the first and second sets of hash values to authenticate the device as being authentic and untampered.

20 Claims, 9 Drawing Sheets

(51) Int. Cl.
*G06V 20/00* (2022.01)
*G06V 20/80* (2022.01)
*H04L 9/32* (2006.01)

(56) References Cited

U.S. PATENT DOCUMENTS

2003/0204743 A1* 10/2003 Devadas ................. G06F 21/31 257/E23.179
2023/0283458 A1* 9/2023 Franklin ............... H04L 9/3247 380/255

OTHER PUBLICATIONS

Asadizanjani N, et al, "Counterfeit Electronics Detection Using Image Processing and Machine Learning", Journal of Physics: Conference Series, Open Access, 2017, 7 pages.
Levin C. et al, "Senate Armed Services Committee Releases Report on Counterfeit Electronic Parts", U.S. Senate Committee on Armed Services, May 21, 2012, 4 pages.
Miao J, et al, "Fabrication of Dynamic Holograms on Polymer Surface by Direct Laser Writing for HighSecurity Anti-Counterfeit Applications", IEEE Access, Oct. 2019, pp. 142926-142933, vol. 7.
Aramoon O., et al, "Impacts of Machine Learning on Counterfeit IC Detection and Avoidance Techniques", IEEE, University of Maryland, College Park, MD, 2020, 2020 21st International Symposium on Quality Electronic Design (ISQED), Santa Clara, CA, USA, 6 pages, https://ieeexplore.ieee.org/document/9136972.
Takahashi T., et al, "Mass-produced Parts Traceability System Based on Automated Scanning of Fingerprint of Things", IEEE, Data Science Research Laboratories, NEC Corporation, Research Gate, 2017 Fifteenth IAPR International Conference on Machine Vision Applications (MVA), Nagoya, Japan May 8-12, 2017, pp. 176-180.
Cardoso B., "A New Method to Authenticate Components and PCB Assemblies Using Fingerprint from x-ray Images", ISTFA 2018 Conference Proceedings from the 44th International Symposium for Testing and Failure Analysis, Phoenix, Arizona, USA, Oct. 28-Nov. 1, 2018, pp. 73-78.

* cited by examiner

METHODS AND TOOLS FOR PREVENTING THE COUNTERFEITING AND TAMPERING OF SEMICONDUCTOR DEVICES

STATEMENT REGARDING FEDERALLY SPONSORED RESEARCH OR DEVELOPMENT

This matter is subject to a contract with the U.S. Government. Pursuant to that contract, the following Government Interest Statement must be included in the Specification of the Patent Application as filed: This Invention was made with Government support under Agreement No. N00164-19-9-0001, awarded by NSWC Crane Division. The Government has certain rights in the Invention

BACKGROUND

There are increasing concerns about semiconductor security and counterfeiting in the global marketplace and cybersecurity strategies must address and prevent hardware systems from being compromised by counterfeit components. The introduction of counterfeit or compromised parts can have a serious impact on national security, and public health and safety when these parts do not perform as intended or otherwise fail or malfunction, and there have been reported cases of counterfeit semiconductor devices infiltrating critical applications in the military and medical sectors.

To counter this growing threat and prevent counterfeits from adversely affecting the performance and reliability of critical systems, the semiconductor industry, governments, and the defense industry are working to address weaknesses in the supply chain and to promote the adoption of aggressive counterfeit avoidance practices. However, counterfeit semiconductor chips and electronic parts may be difficult to identify if they are functionally equivalent to the genuine parts but have additional undesired features that facilitate the release of sensitive data to hostile interests or cause untimely failures. The security measures need to begin with the manufacturers and continue through the supply chain to a final authentication by the end consumer. Ideally, the adopted security measures need to be impossible to defeat and their utilization needs to be difficult to detect by casual observers, as well as by resource-rich, dedicated counterfeiting entities. The authentication and anti-counterfeiting measures must employ non-destructive methods/tests and be automatable. Any weaknesses in the testing regime for counterfeit semiconductor devices and/or electronic parts may create vulnerabilities that could be exploited by counterfeiters.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the present disclosure. The dimensions of the various features or elements may be arbitrarily expanded or reduced for clarity. In the following description, various aspects of the present disclosure are described with reference to the following drawings, in which.

DETAILED DESCRIPTION

Figure 1:
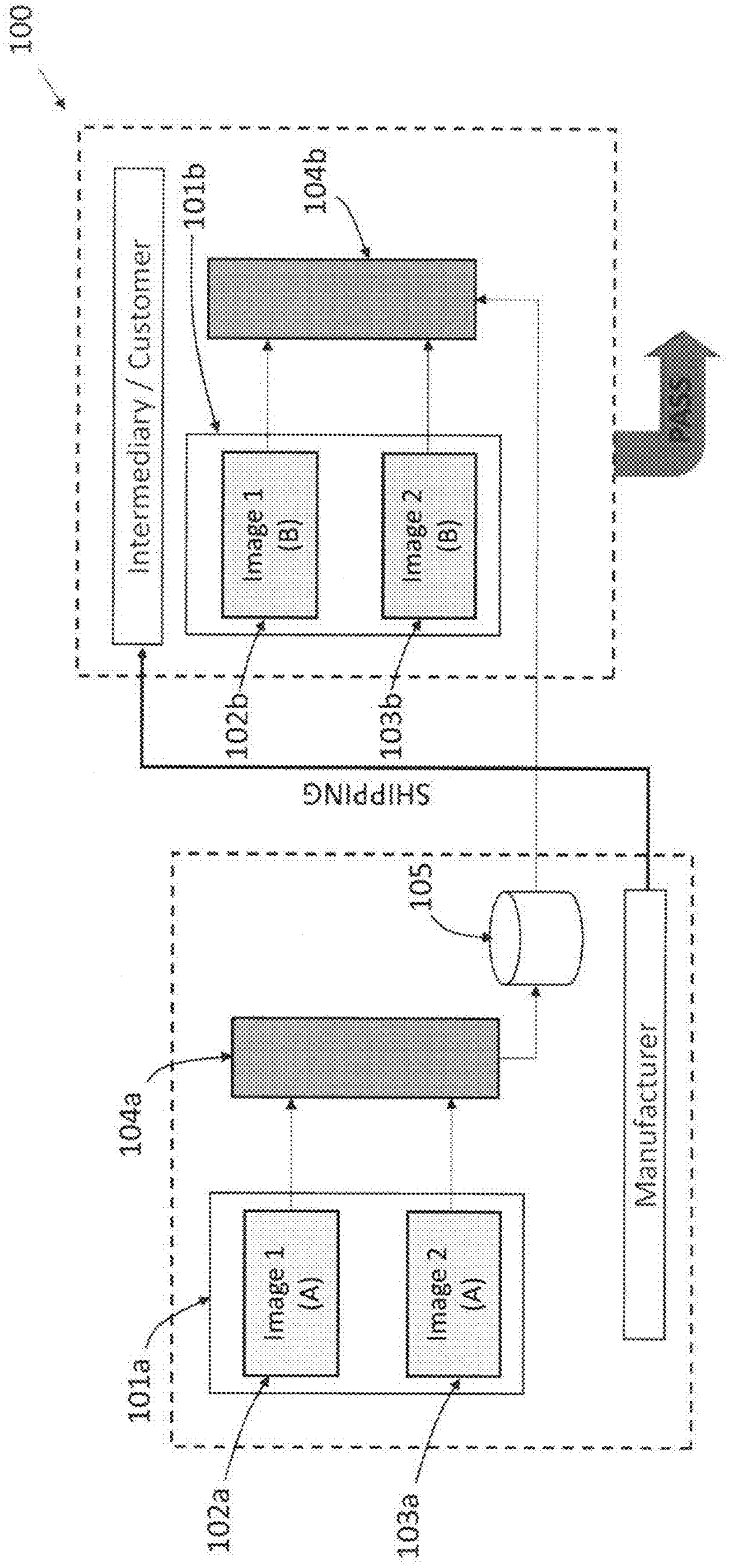
FIG. 1 shows an exemplary schematic representation of an authentication system and methodology for a product according to an aspect of the present disclosure.

The following detailed description refers to the accompanying drawings that show, by way of illustration, specific details, and aspects in which the present disclosure may be practiced. These aspects are described in sufficient detail to enable those skilled in the art to practice the present disclosure. Various aspects are provided for devices, and various aspects are provided for methods. It will be understood that the basic properties of the devices also hold for the methods and vice versa. Other aspects may be utilized and structural, as well as logical changes, may be made without departing from the scope of the present disclosure. The various aspects are not necessarily mutually exclusive, as some aspects can be combined with one or more other aspects to form new aspects.

In an aspect, the present disclosure is directed to a comprehensive physical security methodology that uses key metrologies and inspection tools (e.g., a laser marking tool, an x-ray inspection tool, etc.) to capture images of unit-specific variations (e.g., laser mark patterns) or non-critical defects (e.g., thermal interface material (TIM) voiding, solder bleed out, etc.) as fingerprints or "first images" for products, such as semiconductor devices. In an aspect, these images or fingerprints may then be converted to a digital hash (i.e., hash values) or other secure values that is associated with the product or device. As the semiconductor device, for example, moves from a manufacturer to intermediaries in a supply chain and ultimately to customers, the intermediaries and/or customer may use the same key metrologies and tools to recapture the images that were first taken by the manufacturer, and these recaptured or "second images" may be hashed again using the same hashing algorithms and both set of hash values may be compared to ensure the component is authentic, which can be shown by substantially overlapping hash values.

In another aspect, the present disclosure is directed to an authentication tool, including one or more imaging units for generating images of selected physical features of a device, such as a semiconductor device, positioned on a stage, and a processor coupled to the one or more imaging units and configured to perform a cryptographic hash function. In an aspect, the processor converts the generated images for the device into hash values using a hashing application, and the hash values are associated with the device and provided to intermediaries and customers to perform authentication testing using their own authentication tool and processor. In this aspect, the authentication tool may include an x-ray imaging unit or an optical imaging unit, or a combination of both units as a single authentication tool.

In another aspect, the present disclosure is directed to a method including conducting a first inspection of a device and converting the data from the first inspection to a first set of secure values, and conducting a second inspection of the device and converting the data from the second inspection to a second set of secure values and comparing the first set of secure values with the second set of secure values, for which a substantial overlapping of the first and second sets of secure values shows the device is authentic and untampered.

In another aspect, the present disclosure is directed to an authentication system having a first inspection tool that generates first images for a first inspection of a device and a first processor for processing the first images using a hashing algorithm, for which the first inspection tool and the first processor are sited at a first location and a second inspection tool that generates second images for a second inspection of the device and a second processor for processing the second images using the same hashing algorithm, for which the second inspection tool and the second processor are sited at a second location. In addition, the authentication system has first and second inspection tools that are configured to be copy exact using information provided by a manufacturer of the device.

In another aspect, the key metrologies, inspection tools, processors, and other systems used by intermediaries/customers for authentication may employ a "copy exact" methodology that matches, for example, the equipment, processes and procedures, recipes, etc., at all levels for physical inputs and statistically-matched responses (i.e., outputs) used by the manufacturer to produce the device/product and for inspection and authentication testing. The physical inputs, such as equipment configuration, chemical purity, facilities, equipment hookups, and other inputs, may also use this methodology. The use of a copy exact methodology may allow a first set of hash values obtained by the manufacturer for the device and a second set of hash values obtained by intermediaries/customers for the device to be near identical or substantially overlapping for their authentication testing.

The technical advantages of the present disclosure may include, but are not limited to:

(i) providing product security (i.e., anti-counterfeiting and anti-tampering) with a substantial sensitivity on a unit-to-unit level as an effective authentication method without false positives or negatives, or causing any changes to the physical or functional characteristics of the product;

(ii) providing a methodology that may leverage existing high-volume manufacturing tools and processes that are plan of record;

(iii) employing a hashing algorithm or suitable imaging algorithm that is highly sensitive and can clearly differentiate between similar and dissimilar images with high confidence ensuring that tampered or non-genuine units can be identified with no false positives; and (iv) employing images as fingerprints that may not be easily identified as a security measure since the present authentication methodology uses natural process variations and non-critical defects.

According to the present disclosure, the authentication method may provide unique sets of hash values that become associated with and accompany a device. As well understood, hashing may be defined by two distinct characteristics—irreversibility and uniqueness. It is irreversible because hash values cannot be easily "de-hashed", and it is unique because no two hash values are ever the same for two different pieces of data when using a validated hashing algorithm. For example, ORB similarity, perceptual, and difference image hashing are families of algorithms that may generate content-based image hashes in the present disclosure.

In addition, hash values are highly convenient for comparing files or databases. In an aspect, rather than comparing the present inspection image data in its original form, it is much easier for processors/computers to compare their hash values. A hash algorithm has a mathematical function that converts an input value into a compressed numerical value—a hash or hash value. The processor takes the image data of an arbitrary length and provides an output of a fixed length—the hash value. The size of the data blocks may differ from one algorithm to another but for a particular algorithm, it remains the same.

To more readily understand and put into practical effect the present authentication tools and system, and the methods for a device product and/or semiconductor device authentication, particular aspects will now be described by way of examples provided in the drawings that are not intended as limitations. The advantages and features of the aspects herein disclosed will be apparent through reference to the following descriptions relating to the accompanying drawings. Furthermore, it is to be understood that the features of the various aspects described herein are not mutually exclusive and can exist in various combinations and permutations. For the sake of brevity, duplicate descriptions of features and properties may be omitted.

FIG. 1 shows an exemplary schematic representation of an authentication system 100 and a methodology for product authentication according to an aspect of the present disclosure. In this aspect, the authentication system 100 may have an inspection tool 101*a*, which may generate two images 102*a* and 103*a* (which may originate from one or more imaging units) of a semiconductor device or other product (not shown), and a processor 104*a*, which is coupled to a database or data storage 105, that are located at a manufacturer's site. The images 102*a* and 103*a* may be transmitted to the processor 104*a* to perform a cryptographic hash function that converts the generated images for the device into first hash values, which are associated with the device, for storage as a hash library in the data storage 105. Thereafter, the manufacturer may ship the semiconductor device to an intermediary or customer.

Further to the aspect shown in FIG. 1, the authentication system 100 may have an inspection tool 101*b*, which may provide two images 102*b* and 103*b* (which may originate from one or more imaging units) of the semiconductor device or other product (not shown), and a processor 104*b* that are located at the intermediary's or customer's site. The images 102*b* and 103*b* may be transmitted to the processor 104*b* to perform an identical cryptographic hash function that converts the generated images 102*b* and 103*b* for the device into second hash values, which are associated with the device. The processor 104*b*, which may receive transmissions from the data storage 105 to determine if the device is authentic and untampered, hence is allowed to "pass".

In an aspect, the inspection tool 101*b*, as well as the process used to generate the two images 102*b* and 103*b*, and the processor 104*b* at the intermediary's or customer's site may be, respectively, copy exact versions of the inspection tool 101*a*, the process used to generate the two images 102*a* and 103*a*, and the processor 104*a*. In addition, it is within the scope of the present disclosure to have an inspection tool include a plurality of imaging units and a processor as a single authentication tool, which may further include data storage as part of the authentication tool. In an aspect, an imaging unit may include x-ray devices, optical cameras, infrared cameras, LIDAR, and other imaging devices. In another addition, it is within the scope of the present disclosure to have a processor use an imaging algorithm that provides secure and compressed data values in place of the cryptographic hash function. In another aspect, a processor may include a CPU, a microprocessor, a digital signal processor, a computer, a server and other devices providing logic circuitry.

Figures 2, 2A:
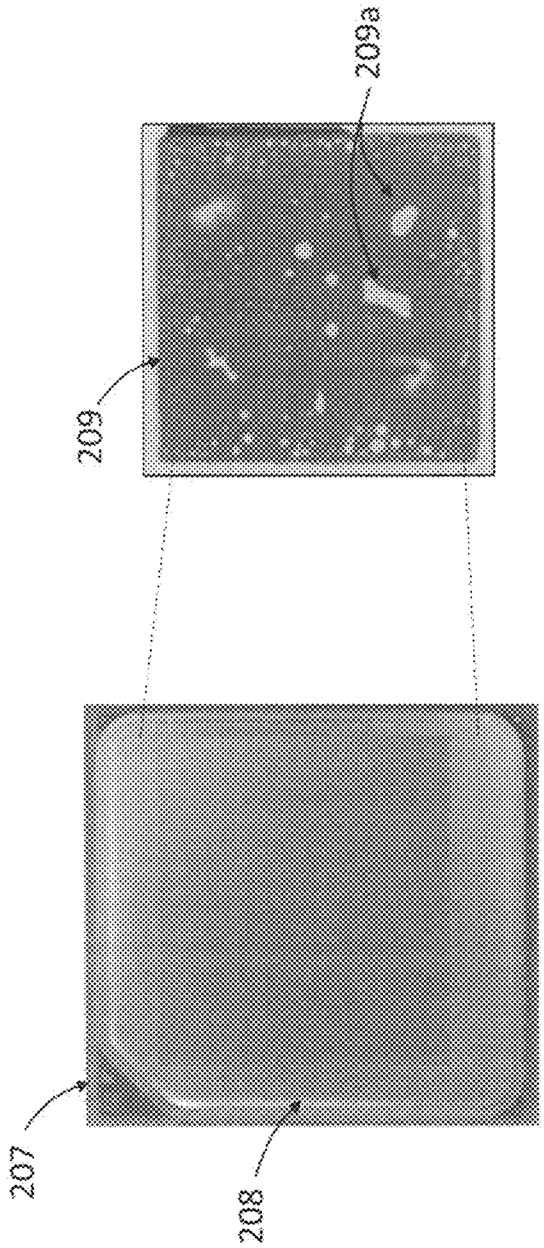
FIGS. 2 and 2A show a representative semiconductor package and an x-ray image for a feature of the package, respectively, according to an aspect of the present disclosure.

FIGS. 2 and 2A show, respectively, a representative semiconductor package 207 and an image obtained using x-ray imaging according to an aspect of the present disclosure. The semiconductor package 207 includes a lid 208 and under the lid 208 may be a thermal interface material (TIM) 209, which is used to dissipate heat from component devices under the lid 208. From the FIG. 2A, a plurality of voids 209*a* may be present under the lid 208 and the voids 209*a* will create an individualized image or fingerprint for the semiconductor package 207 that may be used for authentication in accordance with the present disclosure. It should be understood that another physical feature (e.g., wire bonds, solder voids, pin alignment, etc.) of the semiconductor package 207 may be used for obtaining alternative or additional images for authentication.

Figure 3:
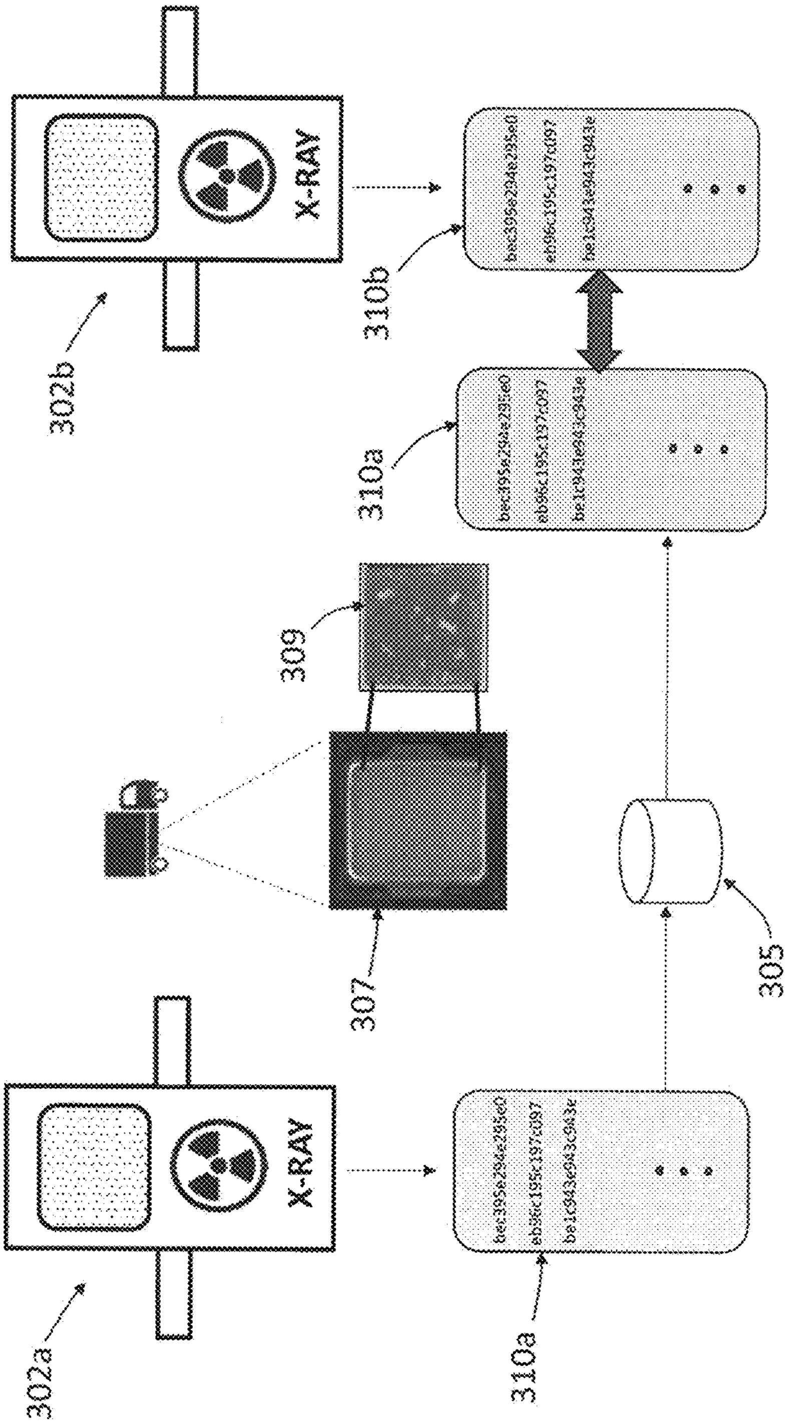
FIG. 3 shows an exemplary authentication methodology for a product provided with hashing values according to an aspect of the present disclosure.

FIG. 3 shows an exemplary authentication methodology for a semiconductor product provided with hashing values according to an aspect of the present disclosure. In this aspect, at a manufacturer's site, an x-ray inspection tool 302*a* may be used to obtain one or more TIM images 309 of a semiconductor package 307 that are converted into a first set of hash values 310*a*, which may be stored in a data storage 305. For example, the hash values may be a hexadecimal hash. The semiconductor package 307 may be shipped to a customer, and at a customer's site, an x-ray inspection tool 302*b* may be used to obtain a second set of hash values 310*a* using a copy exact methodology. The first set of hash values 310*a* may be obtained from data storage 305 and compared with the second set of hash values 310*b* by the customer to determine the authenticity of the semiconductor package 307.

In addition, it is within the scope of the present disclosure to have an x-ray inspection tool included among a plurality of imaging units combined with a processor as a single authentication tool, which may further include data storage as part of the authentication tool used by the manufacturer and/or customer. In another aspect, a manufacturer may use an existing x-ray inspection tool (i.e., used for plan of record processes) to obtain and retain data that may be needed for the present authentication methodology.

Figure 4A:
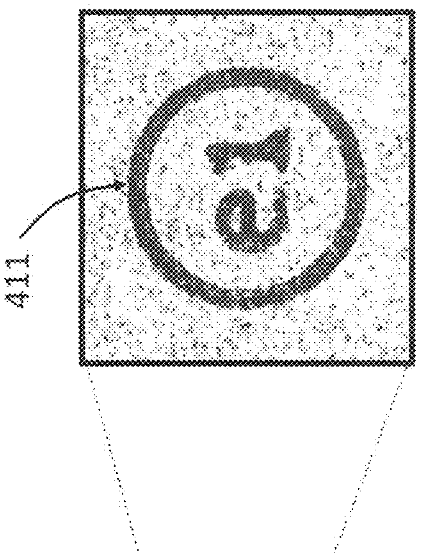
FIGS. 4 and 4A show a representative semiconductor package and an optical image of a mark on the package, respectively, according to an aspect of the present disclosure.
Figure 4:
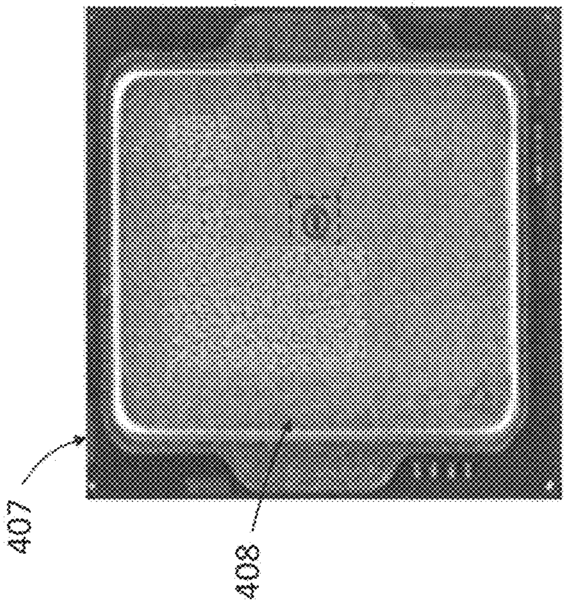

FIGS. 4 and 4A show, respectively, a representative semiconductor package 407 and an optical image of a mark 411 on the package lid 408, according to an aspect of the present disclosure. In an aspect, the mark 411 may be placed on the lid 408 by laser etching/marking or other methods that are not easily removed and may be part of a larger image that is not placed intentionally as a security feature. Due to variations in the surface of the lid 408 and the processing conditions during the laser etching, as an interaction between the laser tool and the lid surface, the mark 411 will be an individualized image or fingerprint for the semiconductor package 407 that may be used for authentication in accordance with the present disclosure. In addition, the natural "noise" from the laser etching, e.g., speckles, may be used to generate a fingerprint using hashing algorithms for the present authentication methodology.

It should be understood that mark 411 is provided as an example, and a designated security mark may take a variety of forms on the semiconductor package 407, including being near invisible under ordinary human visual inspection, for the purpose of authentication. In addition, while not shown, it is within the scope of the present disclosure to have the mark 411 be placed at other locations (e.g., a package substrate for a lidless or naked chip package).

Figure 5:
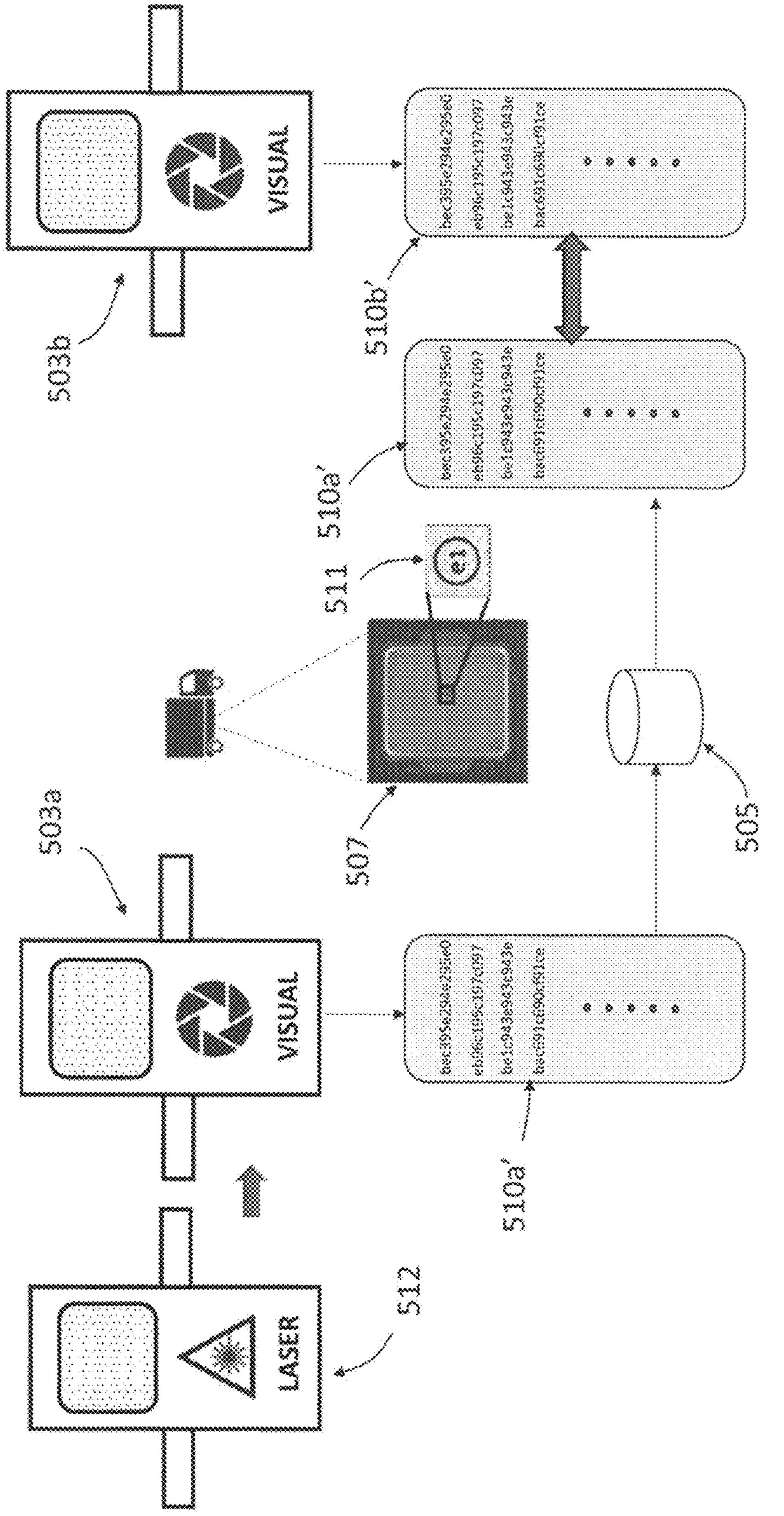
FIG. 5 shows another exemplary authentication methodology for a product provided with hashing values according to another aspect of the present disclosure.

FIG. 5 shows an exemplary authentication methodology or inspection protocol for a semiconductor product provided with hashing values according to an aspect of the present disclosure. In this aspect, at a manufacturer's site, a laser etching tool 512 may place one or more marks (e.g., mark 511) on a semiconductor package 507 and a digital visual inspection tool 503*a* may be used to obtain one or more images of the mark 511, which may be converted into a first set of hash values 510*a*' and stored in a data storage 505. The semiconductor package 507 may be shipped to a customer, and at a customer's site, a digital visual inspection tool 503*b* may be used to obtain a second set of hash values 510*b*' using a copy exact methodology. The first set of hash values 510*a*' may be obtained from data storage 505 and compared with the second set of hash values 510*b*' by the customer to determine the authenticity of the semiconductor package 507.

In addition, it is within the scope of the present disclosure to have a digital visual inspection tool included among a plurality of imaging units combined with a processor as a single authentication tool, which may further include data storage as part of the authentication tool used by the manufacturer and/or customer. In another aspect, a manufacturer may use an existing digital visual inspection tool (i.e., used for plan of record processes) to obtain and retain data that may be needed for the present authentication methodology or inspection protocol.

Figure 6:
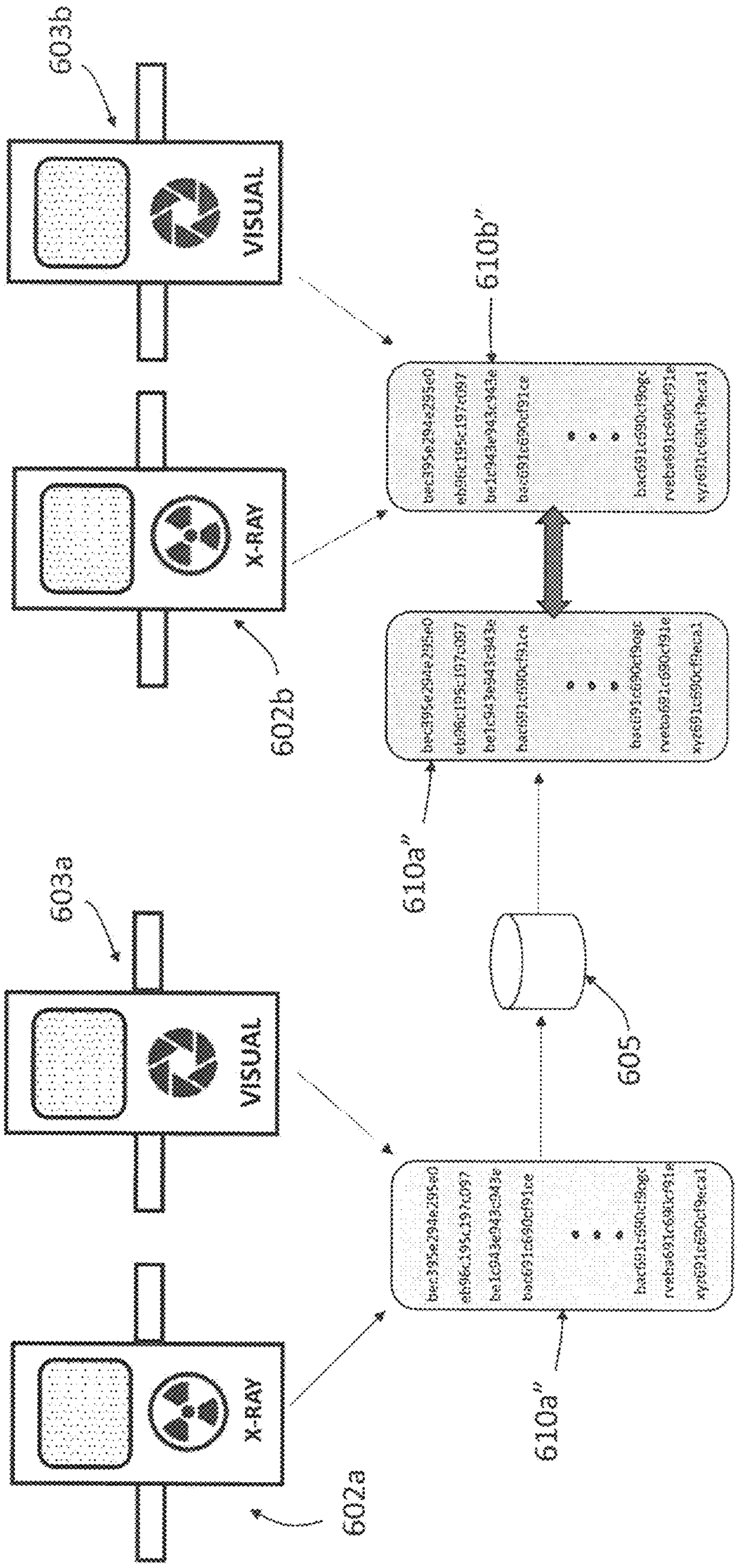
FIG. 6 shows another exemplary authentication methodology for a product provided with hashing values according to yet another aspect of the present disclosure.

FIG. 6 shows another exemplary authentication methodology or inspection protocol for a product provided with hashing values according to yet another aspect of the present disclosure. In this aspect, at a manufacturer's site, an x-ray inspection tool 602*a* and digital visual inspection tool 603*a* may be used to obtain at least two images (not shown), which may be converted into a first combined set of hash values 610*a*" and stored in a data storage 605. At a customer's site, an x-ray inspection tool 602*b* and a digital visual inspection tool 603*b* may be used to obtain a second set of hash values 610*b*" using a copy exact methodology. The first set of hash values 610*a*" may be obtained from data storage 605 and compared with the second set of hash values 610*b*" by the customer to determine the authenticity of a semiconductor package or other product.

In addition, it is within the scope of the present disclosure to have both an x-ray inspection tool and a digital visual inspection tool included among a plurality of imaging units combined with a processor as a single authentication tool, which may further include a data storage as part of the authentication tool used by the manufacturer and/or customer. In another aspect, a manufacturer may use existing x-ray inspection tools and digital visual inspection tools (i.e., used for plan of record processes) to obtain and retain data that may be needed for the present authentication methodology. It is also within the scope of the present disclosure to have the present authentication system, tools and methodology be automated (e.g., using conveyors or handlers for positioning trays of semiconductor devices onto a tool's stage) similar to existing inspection systems and tools.

Figure 7B:
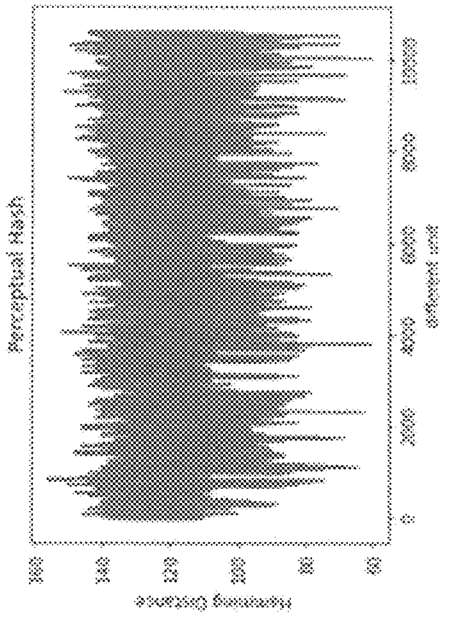
FIGS. 7A and 7B show exemplary data for x-ray images using a hashing algorithm.
Figure 7A:
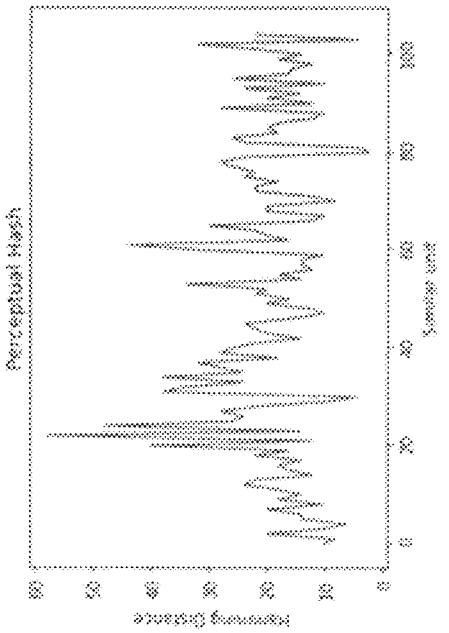

In accordance with the present disclosure, FIGS. 7A and 7B show exemplary data for x-ray images of TIM voids using hashing algorithms that provide unique fingerprints, which is also known as image hashing, resulting in a high degree of accuracy for authentication. Based on data obtained from large sets of x-ray images, FIG. 7A shows data for similar first-type devices and FIG. 7B shows data for different second-type devices, which may be obtained by pre-processing the x-ray images obtained from various inspection tools, such as the targeting of certain locations in the images and cropping the images to eliminate non-essential portions of the images.

Figure 9:
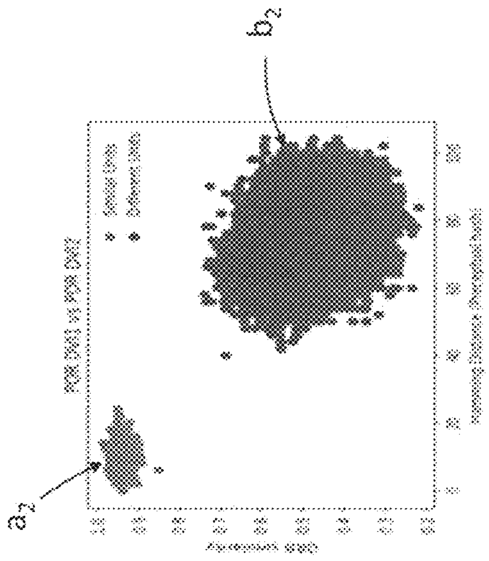
FIGS. 8 and 9 show exemplary data for laser images using a hashing algorithm.
Figure 8:
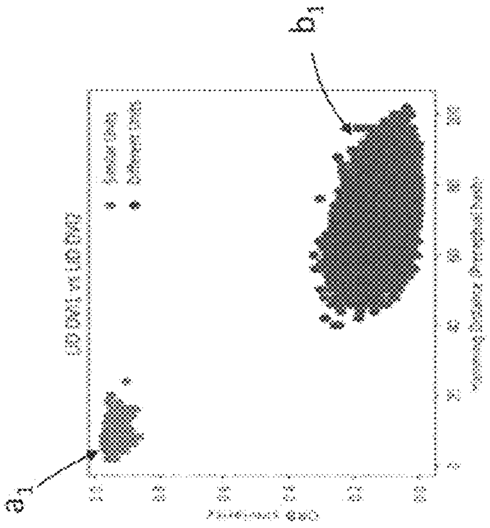

FIGS. 8 and 9 show exemplary data for laser mark images using hashing algorithms. In FIG. 8, in accordance with the present disclosure, a data grouping $a_1$ may be obtained for similar first-type devices and a data grouping $b_1$ may be obtained for different second-type devices. There is no overlap in the x (hamming) or y-axis (similarity). Similarly, in FIG. 9, a data grouping $a_2$ may be obtained for similar third-type devices and a data grouping $b_2$ may be obtained for different fourth-type devices. Again, there is no overlap in the x (hamming) or y-axis (similarity). The data in FIGS. 8 and 9 may be obtained by pre-processing the laser mark images obtained from various inspection tools, such as the targeting of certain locations in the images and cropping the images to eliminate non-essential portions of the images. In an aspect, a higher degree of pre-processing may lead to more definitive results and confidence in the authentication methodology.

Figure 10:
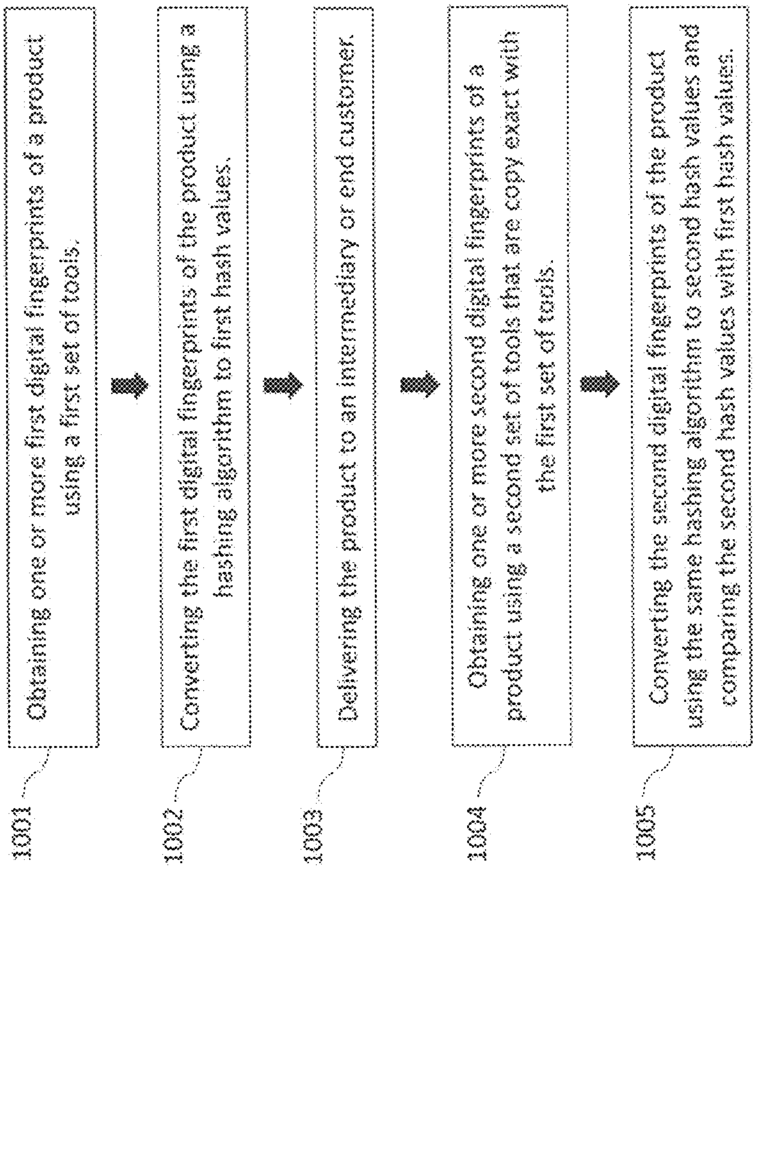
FIG. 10 shows a simplified flow diagram for a further exemplary method according to a further aspect of the present disclosure.

FIG. 10 shows a simplified flow diagram for a further exemplary method according to a further aspect of the present disclosure. In an aspect, the present method may be able to provide semiconductor device or other product authentication using the operations below.

The operation 1001 may be directed to obtaining one or more first digital fingerprints of a product using a first set of tools.

The operation 1002 may be directed to converting the first digital fingerprints of the product using a hashing algorithm to first hash values.

The operation 1003 may be directed to delivering the product to an intermediary or end customer, along with providing availability to the first hash values associated with the product.

The operation 1004 may be directed to obtaining one or more second digital fingerprints of a product using a second set of tools that are copy exact with the first set of tools.

The operation 1005 may be directed to converting the second digital fingerprints of the product using the same hashing algorithm to second hash values and comparing the second hash values with the first hash values.

In accordance with the present disclosure, for example, for lidded semiconductor products using a solder thermal interface (TIM), the semiconductor products may be scanned through an x-ray inspection tool, as part of a normal process flow. A solder TIM leaves unique voiding signatures and an x-ray image may be captured as a security fingerprint. In addition, lidded products are typically marked with a manufacturer's logos and identifiers at the laser mark module, as part of a normal process flow. A post-final package assembly will have the product pass through one or more inspection modules, where a visual inspection tool may be used to check a variety of metrics for quality, and at this point, a digital visual image of the laser-marked lid may be captured as another security fingerprint. The semiconductor products may be shipped to intermediaries and/or customers, with unique x-ray and inspection (laser mark) images securely sent or made available as a first set of hash values to such intermediaries and/or customers for each unit. An algorithm for image hashing (e.g., perpetual and/or difference hash) generates unique hash values for the laser mark inspection and x-ray images. The intermediaries and/or customers may use the x-ray and inspection metrologies provided by the manufacturer to capture additional images of the units and create a second set of hash values. The images, as hash values, for each unit taken pre-shipping (by the manufacturer) and post-shipping (by the intermediary or customer) are compared, and failing products are removed.

In an aspect, the hashing algorithms may provide a high level of confidence based on the hamming distance results in identifying and differentiating between images taken of the same unit on different tools versus non-similar units. It is within the scope of the present disclosure to use other algorithms capable of converting images to "secure values", which are unique, allow for differentiation between images, and can be stored and securely transmitted between a manufacturer and its intermediaries and customers. The present authentication methodology may ensure that a unit is genuine and has not been tampered with.

It will be understood that any specific property described herein for a particular aspect of an authentication system, authentication tool, and method may also generally hold for any of the other aspects thereof described herein. It will also be understood that any specific property described herein for a specific method may generally hold for any of the other methods described herein. Furthermore, it will be understood that for any tool, system, or method described herein, not necessarily all the components or operations described will be enclosed in the tool, system, or method, but only some (but not all) components or operations may be enclosed.

To more readily understand and put into practical effect the present reticle assemblies and sensor assemblies, they will now be described by way of examples. For the sake of brevity, duplicate descriptions of features and properties may be omitted.

EXAMPLES

Example 1 provides an authentication tool including one or more imaging units for generating images of selected physical features of a device (e.g., semiconductor device) positioned on a stage, and a processor coupled to the one or more imaging units and configured to perform a cryptographic hash function, for which the processor converts the generated images for the device into hash values and the hash values are associated with the device.

Example 2 may include the authentication tool of example 1 and/or any other example disclosed herein, for which the processor generates the hash values using a hashing application.

Example 3 may include the authentication tool of example 1 and/or any other example disclosed herein, for which the one or more imaging units further comprise an x-ray imaging unit and/or an optical imaging unit.

Example 4 may include the authentication tool of example 3 and/or any other example disclosed herein, for which the device includes a lid having a thermal interface material (TIM) with TIM voids under the lid, and for which the selected physical features for the devices being the TIM voids, and the generated images by the x-ray imaging unit comprise images of the TIM voids.

Example 5 may include the authentication tool of example 3 and/or any other example disclosed herein, for which the selected physical feature for the device being the laser etchings and the generated images by optical imaging unit includes images of the laser etchings.

Example 6 may include the authentication tool of example 1 and/or any other example disclosed herein, further including a data library for storing the hash values, for which the data library is accessible to one or more entities obtaining possession or control of the device.

Example 7 may include the authentication tool of example 1 and/or any other example disclosed herein, for which the device is provided with a manufacturer's hash values and further including the processor comparing the hash values for the device with the manufacturer's hash values provided with the device.

Example 8 may include the authentication tool of example 1 and/or any other example disclosed herein, for which the stage further includes a support for receiving a plurality of devices for an automated inspection.

Example 9 provides a method including conducting a first inspection of a device using an inspection protocol at a first site, generating data from the first inspection of the device, converting the data from the first inspection to a first set of secure values, for which the device is delivered to a second site and the first set of secure values is used for authenticating the device.

Example 10 may include the method of example 9 and/or any other example disclosed herein, further including conducting a second inspection of the device using the inspection protocol at a second site, generating data from the second inspection of the device, converting the data from the second inspection to a second set of secure values, and comparing the first set of secure values with the second set of secure values, for which comparing the first set of secure values with the second set of secure values shows a substantial overlapping of the first and second sets of secure values when the device is authentic and untampered.

Example 11 may include the method of example 9 and/or any other example disclosed herein, for which the first and second inspections are conducted using one or more inspection tools that are configured to be copy exact.

Example 12 may include the method of example 9 and/or any other example disclosed herein, for which the first inspection is conducted by a manufacturer of the device and the second inspection is conducted by one or more entities obtaining possession or control of the device.

Example 13 may include the method of example 11 and/or any other example disclosed herein, for which the first and second inspections comprise generating one or more images of selected physical features of the device using the inspection tools.

Example 14 may include the method of example 11 and/or any other example disclosed herein, for which the inspection tools comprise an x-ray imaging unit and/or an optical imaging unit.

Example 15 may include the method of example 12 and/or any other example disclosed herein, for which the comparing the first set of secure values with the second set of secure values is conducted by the one or more entities obtaining possession or control of the device.

Example 16 may include the method of example 12 and/or any other example disclosed herein, for which converting the data from the first and second inspections to the respective first and second sets of secure values include a first step of pre-processing the one or more images from the first and second inspections, respectively, and a second step of generating the first and second sets of secure values, respectively, using a hashing algorithm.

Example 17 provides an authentication system including a first inspection tool, for which the first inspection tool generates first images for a first inspection of a device, and a first processor for processing the first images using a hashing algorithm, for which the first inspection tool and the first processor are sited at a first location, and a second inspection tool, for which the second inspection tool generates second images for a second inspection of the device, and a second processor for processing the second images using the hashing algorithm, for which the second inspection tool and the second processor are sited at a second location.

Example 18 may include the authentication system of example 17 and/or any other example disclosed herein, for which the first inspection tools and second inspection tools are configured to be copy exact using information provided by a manufacturer of the device.

Example 19 may include the authentication system of example 17 and/or any other example disclosed herein, for which the processing of the first images using the hashing algorithm generates a first set of hash values and the processing of the second images using the hashing algorithm generates a second set of hash values, for which the hashing algorithm is executed with parameters provided by the device's manufacturer.

Example 20 may include the authentication system of example 19 and/or any other example disclosed herein, further including the second processor comparing the first and second sets of hash values to authenticate the device as being authentic and untampered.

The term "comprising" shall be understood to have a broad meaning similar to the term "including" and will be understood to imply the inclusion of a stated integer or operation or group of integers or operations but not the exclusion of any other integer or operation or group of integers or operations. This definition also applies to variations on the term "comprising" such as "comprise" and "comprises".

The term "coupled" (or "connected") herein may be understood as electrically coupled or as mechanically coupled, e.g., attached or fixed or attached, or just in contact without any fixation, and it will be understood that both direct coupling or indirect coupling (in other words: coupling without direct contact) may be provided.

The terms "and" and "or" herein may be understood to mean "and/or" as including either or both of two stated possibilities.

While the present disclosure has been particularly shown and described with reference to specific aspects, it should be understood by those skilled in the art that various changes in form and detail may be made therein without departing from the spirit and scope of the present disclosure as defined by the appended claims. The scope of the present disclosure is thus indicated by the appended claims and all changes which come within the meaning and range of equivalency of the claims are therefore intended to be embraced.

What is claimed is:

1. An authentication tool comprising:

one or more imaging units for generating images of selected physical features of a device positioned on a stage; and a processor coupled to the one or more imaging units and configured to perform a cryptographic hash function, wherein the processor converts the generated images for the device into hash values and the hash values are associated with the device, wherein the one or more imaging units and the processor are configured to be copy exact with one or more imaging units and a processor of a second authentication tool at a second location by matching processes and procedures using information provided by a manufacturer of the device, and wherein being copy exact comprises configuring one or more second inspection tools and a process used thereby to match the equipment, processes and procedures, and recipes of one or more first inspection tools and a process used thereby, using information provided by the manufacturer of the device; such that physical inputs and statistically-matched outputs are substantially reproduced between a first and a second inspection.

2. The authentication tool of claim 1, wherein the processor generates the hash values using a hashing application.

3. The authentication tool of claim 1, wherein the one or more imaging units further comprise an x-ray imaging unit and/or an optical imaging unit.

4. The authentication tool of claim 3, wherein the device comprises a lid having a thermal interface material (TIM) with TIM voids under the lid; and wherein the selected physical features for the device being the TIM voids, and the generated images by the x-ray imaging unit comprise images of the TIM voids.

5. The authentication tool of claim 3, wherein the selected physical feature for the device being one or more laser etchings and the generated images by optical imaging unit comprising images of the laser etchings.

6. The authentication tool of claim 1, further comprising a data library for storing the hash values, wherein the data library is accessible to one or more entities obtaining possession or control of the device.

7. The authentication tool of claim 1, wherein the device is provided with a manufacturer's hash values, and wherein the processor compares the hash values for the device with the manufacturer's hash values provided with the device.

8. The authentication tool of claim 1, wherein the stage further comprises a support for receiving a plurality of devices for an automated inspection.

9. A method comprising:

conducting a first inspection of a device using an inspection protocol at a first site, wherein the first inspection comprises generating one or more images of physical features of the device using one or more first inspection tools;

generating data from the first inspection of the device;

converting the data from the first inspection to a first set of secure values, wherein the device is delivered to a second site and the first set of secure values is used for authenticating the device;

conducting a second inspection of the device using the inspection protocol at a second site, wherein the second inspection comprises generating one or more images of the physical features of the device using one or more second inspection tools;

generating data from the second inspection of the device:

converting the data from the second inspection to a second set of secure values; and comparing the first set of secure values with the second set of secure values;

wherein a substantial overlapping of the first and second sets of secure values indicates the device is authentic and untampered;

wherein the one or more second inspection tools and a process used by the one or more second inspection tools to generate the one or more images of the physical features in the second inspection are respectively copy exact with the one or more first inspection tools and a process used by the one or more first inspection tools to generate the one or more images of the physical features in the first inspection, and wherein being copy exact comprises configuring the one or more second inspection tools and the process used thereby to match the equipment, processes and procedures, and recipes of the one or more first inspection tools and the process used thereby, using information provided by a manufacturer of the device, such that physical inputs and statistically-matched outputs are substantially reproduced between the first and second inspections.

10. The method of claim 9, further comprising:

conducting a second inspection of the device using the inspection protocol at a second site;

generating data from the second inspection of the device;

converting the data from the second inspection to a second set of secure values; and comparing the first set of secure values with the second set of secure values, wherein the comparing of the first set of secure values with the second set of secure values shows a substantial overlapping of the first and second sets of secure values when the device is authentic and untampered.

11. The method of claim 9, wherein the first inspection is conducted by a manufacturer of the device and the second inspection is conducted by one or more entities obtaining possession or control of the device.

12. The method of claim 9, wherein the first and second inspections comprise generating one or more images of physical features of the device using the first and second inspection tools.

13. The method of claim 9, wherein the first and second inspection tools comprise an x-ray imaging unit and/or an optical imaging unit.

14. The method of claim 11, wherein the comparing the first set of secure values with the second set of secure values is conducted by the one or more entities obtaining possession or control of the device.

15. The method of claim 11, wherein the converting the data from the first and second inspections to the respective first and second sets of secure values comprises a first step of pre-processing the one or more images from the first and second inspections, respectively, and a second step of generating the first and second sets of secure values, respectively, using a hashing algorithm.

16. The method of claim 9 further comprising comparing the second set of secure values for the device with a manufacturer's hash values provided with the device.

17. An authentication system comprising:

a first inspection tool, wherein the first inspection tool generates first images for a first inspection of a device;

a first processor for processing the first images using a hashing algorithm, wherein the first inspection tool and the first processor are sited at a first location;

a second inspection tool, wherein the second inspection tool generates second images for a second inspection of the device; and a second processor for processing the second images using the hashing algorithm, wherein the second inspection tool and the second processor are sited at a second location; and wherein the second inspection tool, a process used by the second inspection tool to generate the second images, and the second processor are respectively copy exact with the first inspection tool, a process used by the first inspection tool to generate the first images, and the first processor, and wherein being copy exact comprises configuring the second inspection tool and a process used thereby to match the equipment, processes and procedures, and recipes of the first inspection tool and a process used thereby, using information provided by a manufacturer of the device, such that physical inputs and statistically-matched outputs are substantially reproduced between the first and second inspections.

18. The authentication system of claim 17, wherein the processing of the first images using the hashing algorithm generates a first set of hash values and the processing of the second images using the hashing algorithm generates a second set of hash values, wherein the hashing algorithm is executed with parameters provided by the device's manufacturer.

19. The authentication system of claim 18, further comprising the second processor comparing the first and second sets of hash values to authenticate the device as being authentic and untampered.

20. The authentication system of claim 18, wherein the first and second inspection tools comprise an x-ray imaging unit and/or an optical imaging unit.

* * * * *